(12) United States Patent
Makioka

(10) Patent No.: US 7,457,884 B2
(45) Date of Patent: Nov. 25, 2008

(54) NETWORK ENVIRONMENT NOTIFYING METHOD, NETWORK ENVIRONMENT NOTIFYING SYSTEM, AND PROGRAM

(75) Inventor: Katsuya Makioka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 585 days.

(21) Appl. No.: 10/253,651

(22) Filed: Sep. 25, 2002

(65) Prior Publication Data
US 2003/0074479 A1 Apr. 17, 2003

(30) Foreign Application Priority Data
Sep. 25, 2001 (JP) .......................... P.2001-291519

(51) Int. Cl.
*G06F 15/173* (2006.01)
(52) U.S. Cl. ........................ 709/250; 709/220; 709/238
(58) Field of Classification Search ................ 709/250, 709/238, 220
See application file for complete search history.

(56) References Cited

U.S. PATENT DOCUMENTS

| | | | | |
|---|---|---|---|---|
| 6,954,784 | B2 * | 10/2005 | Aiken et al. ................. | 709/220 |
| 2002/0083342 | A1 * | 6/2002 | Webb et al. ................... | 713/201 |
| 2002/0083344 | A1 * | 6/2002 | Vairavan ...................... | 713/201 |
| 2002/0112071 | A1 * | 8/2002 | Kim ............................ | 709/238 |
| 2002/0133549 | A1 * | 9/2002 | Warrier et al. ............... | 709/204 |
| 2002/0184529 | A1 * | 12/2002 | Foster et al. ................. | 713/201 |
| 2003/0033418 | A1 * | 2/2003 | Young et al. ................. | 709/230 |
| 2003/0048780 | A1 * | 3/2003 | Phomsopha .................. | 370/389 |
| 2004/0210774 | A1 * | 10/2004 | Chitturi et al. .............. | 713/201 |
| 2005/0160477 | A1 * | 7/2005 | Saito ........................... | 726/12 |

FOREIGN PATENT DOCUMENTS

| | | |
|---|---|---|
| JP | 08-084128 A | 3/1996 |
| JP | 156852 A | 6/2001 |

OTHER PUBLICATIONS

Masataka Takemaru, Internet Magazine, No. 60, Japan, Impress Co., Jan. 1, 2000, pp. 220-237.

* cited by examiner

*Primary Examiner*—Bunjob Jaroenchonwanit
*Assistant Examiner*—Nghi V Tran
(74) *Attorney, Agent, or Firm*—Birch, Stewart, Kolasch & Birch, LLP

(57) ABSTRACT

When a PC establishes a communication via the Internet with another external PC, at least one of investigation methods is executed prior to a commencement of the communication in a system provided by this invention. The methods are an IP address investigation for investigating whether it is global or private; an IP address comparison for comparing an IP address recognized by an external terminal with the IP address which has been allocated to the own terminal; and a port-scanning judgement for judging as to the PC can access the external PC by executing a port-scanning with respect to a port used by the communication application program from the external terminal. By those methods, when there is a possibility that the communication application program cannot be used due to a certain reason of the investigated network environment, this fact is displayed on a screen so as to be notified to the user.

10 Claims, 4 Drawing Sheets

NETWORK ENVIRONMENT NOTIFYING METHOD, NETWORK ENVIRONMENT NOTIFYING SYSTEM, AND PROGRAM

BACKGROUND OF THE INVENTION

1. Field of the Invention

The present invention is related to a method, system and program for network environment notifying, which are used to investigate a network environment of a user so as to notify the investigated network environment when a communication application program such as a network telephone and a TV telephone is used on a network.

2. Description of the Related Art

Very recently, while networks such as the Internet are positively popularized, networks are utilized in fields other than electronic mails and WWW (World Wide Web) browsing.

On the other hand, in IP networks using IP (Internet Protocol), which is typically known as the Internet, there is such a problem that IP addresses are exhausted in accordance with the presently popularized IPv4. Also, local networks are constructed in these IP networks. That is, in such a local network, private IP addresses have been allocated to the respective terminals by employing such an address translation function as NAT (Network Address Translation) and IP Masquerade, in which a single global IP address is commonly used by a plurality of terminals. Very recently, dial-up routers equipped with functions as NAT and IP Masquerade have been marketed in low cost, and thus, have been popularized. Also, in a certain network in which a certain cable TV station may provide services, while global IP addresses are not opened with respect to user terminals, only such an environment of private IP addresses based upon NAT and IP Masquerade is provided.

Under such a circumstance, for instance, when either a network telephone or a TV telephone using the H.323 protocol is used, since the IP Masquerade is utilized, there is a problem that a communication cannot be established by terminals to which private IP addresses have been allocated.

Conventionally, application programs (application software) capable of providing network telephone functions and TV telephone functions on terminals by personal computers (will be referred to as "PCs" hereinafter) have been originally designed for such a case that PCs under use may acquire global IP addresses and are connected to the Internet, or such a case that PCs under use establish communications within one private network. Therefore, such PCs having private IP addresses operated under IP Masquerade environment cannot communicate with terminals of counter parties via the Internet. Under such an IP Masquerade environment, users make a large number of complaints as well as a great number of interrogations such as "application programs cannot be used" with respect to support stations of these application programs providers, which may increase supporting cost of these application programs providers.

Even when such terminals are employed to which private IP addresses have been allocated under IP Masquerade, these terminals may use network telephones and TV telephones, which utilize the H.323 protocol, in accordance with conventional techniques where exclusively-dedicated gateway apparatus are provided. For instance, Japanese Laid-open Patent Application No. 2001-156852 discloses the network address translating apparatus. That is, this network address translating apparatus is comprised of the call control translating unit and the voice converting unit in addition to the address translating unit for transferring the address requests among the gate keepers of the plural IP networks so as to acquire the address information. This call control translating unit transfers the call setting requests among the gate keepers, and also, sets the translation information by referring to the address information, and then, produces the voice port corresponding thereto. The voice converting unit transfers the voice signal by using the voice port produced with reference to the translation information. With employment of such an arrangement, both the telephone calling and the call reception can be available between the terminals having the private IP addresses, which cannot be accessed outside the IP networks, and the terminals to which either the global IP addresses or the private IP addresses of other networks have been allocated.

SUMMARY OF THE INVENTION

As previously described, while the communication application programs capable of providing the network telephone function and/or the TV telephone function are utilized on the terminals such as PCs, there is a certain possibility that such communication application programs may not be utilized, depending upon network environments of users, for example, under such a condition that terminals of users are operated under IP Masquerade environment. In such a case, the users cannot correctly grasp the present reason. That is, since the communication application programs are set in an incorrect manner and/or these communication application programs themselves contain bugs, the users cannot utilize the communication application programs. Otherwise, since the present network environment is not properly set, the users cannot utilize the communication application programs. As a result, these users interrogates all these items to the support stations. Accordingly, there is such a problem that since the support stations must answer a large number of such interrogations, support cost thereof is increased.

The present invention has been made to solve the problem of the conventional technique, and therefore, has an object to provide a network environment notifying method, a network environment notifying system, and a program, by which when a communication application program is used via a network, such a possibility that a communication cannot be established due to a network environment can be notified to a user prior to a commencement of the communication, and confusion of users can be reduced.

A network environment notifying method, according to an aspect of the present invention, is featured by that in a method for notifying a network environment of a terminal when a communication is carried out between terminals via a network by a communication application program prior to a commencement of the communication, such a network environment notifying method is comprised of: an investigation step for investigating a network environment related to a terminal in which the communication application program is operated; and a notification step for notifying such a fact that there is a possibility that the communication application program cannot be used based upon a result of the investigation step.

Also, the investigation step preferably includes an IP address investigation step for investigating an IP address which has been allocated to the own terminal in which the communication application is operated, and for judging as to whether or not the investigated IP address corresponds to a global IP address.

Also, the investigation step preferably includes: an IP address comparison step for acquiring an externally-recognized IP address as to the own terminal in which the communication application is operated, and for comparing the externally-recognized IP address with the IP address which has been allocated to the own terminal in order to judge as to whether or not the externally-recognized IP address is made consistent with the IP address allocated to the own terminal.

Also, the investigation step preferably includes a port-scanning judgement step for externally executing a port-scanning operation with respect to a port used in the communication of the own terminal in which the communication application program is operated in order to judge as to whether or not the port-scanning operation succeeds.

Also, in the investigation step, at least any one of the below-mentioned steps is preferably carried out, namely, an IP address investigation step for investigating an IP address which has been allocated to the own terminal in which the communication application is operated, and for judging as to whether or not the investigated IP address corresponds to a global IP address; an IP address comparison step for acquiring an externally-recognized IP address as to the own terminal, and for comparing the externally-recognized IP address with the IP address which has been allocated to the own terminal in order to judge as to whether or not the externally-recognized IP address is made consistent with the IP address allocated to the own terminal; and a port-scanning judgement step for externally executing a port-scanning operation with respect to a port used in the communication of the own terminal in order to judge as to whether or not the port-scanning operation succeeds.

A network environment notifying system, according to another aspect of the present invention, is featured by that in a system for notifying a network environment of a terminal when a communication is carried out between terminals via a network by a communication application program prior to a commencement of the communication, such a network environment notifying system is comprised of: investigation means for investigating a network environment related to a terminal in which the communication application program is operated; and notification means for notifying such a fact that there is a possibility that the communication application program cannot be used based upon a result of the investigation means.

Also, the network environment notifying system is preferable comprised of at least any one of the below-mentioned means, as the investigation means, namely, IP address investigation means for investigating an IP address which has been allocated to the own terminal in which the communication application is operated, and for judging as to whether or not the investigated IP address corresponds to a global IP address; IP address comparison means for acquiring an externally-recognized IP address as to the own terminal, and for comparing the externally-recognized IP address with the IP address which has been allocated to the own terminal in order to judge as to whether or not the externally-recognized IP address is made consistent with is the IP address allocated to the own terminal; and port-scanning judgement means for externally executing a port-scanning operation with respect to a port used in the communication of the own terminal in order to judge as to whether or not the port-scanning operation succeeds.

Also, the network environment notifying system is preferably comprised of, as the investigation means, IP address investigation means for investigating an IP address which has been allocated to the own terminal in which the communication application is operated, and for judging as to whether or not the investigated IP address corresponds to a global IP address.

Also, the network environment notifying system is preferably comprised of, as the investigation means, IP address comparing means for interrogating an externally-recognized IP address as to the own terminal in which the communication application program is operated with respect to an external server, and for comparing the acquired externally-recognized IP address with the IP address which has been allocated to the own terminal in order to judge as to whether or not the externally-recognized IP address is made consistent with the IP address allocated to the own terminal; and the external server connected via the network to the terminal is comprised of IP address acquiring means for acquiring an IP address which is recognized outside the terminal in response to an interrogation issued from the terminal and for returning the acquired IP address to the terminal.

Also, the network environment notifying system is preferably comprised of, as the investigation means, port-scanning judgement means for requesting an external server to execute a port-scanning operation with respect to a port used in a communication of the own terminal, in which the communication application program is operated in order to judge as to whether or not the port-scanning operation succeeds; and the external server connected via the network to the terminal is comprised of port-scanning operation executing means for executing a port-scanning operation with respect to a port used in the communication of the terminal in response to a request issued from the terminal, and for returning a result of the port-scanning operation to the terminal.

A computer-executable program, according to a further aspect of the present invention, is featured by that in a program executable by a computer for notifying a network environment of a terminal when a communication is carried out between terminals via a network by a communication application program prior to a commencement of the communication, such a computer-executable program is comprised of: an investigation step for investigating a network environment related to a terminal in which the communication application program is operated; and a notification step for notifying such a fact that there is a possibility that the communication application program cannot be used based upon a result of the investigation step.

Also, the investigation step preferably includes an IP address investigation step for investigating an IP address which has been allocated to the own terminal in which the communication application is operated, and for judging as to whether or not the investigated IP address corresponds to a global IP address.

Also, the investigation step preferably includes an IP address comparing means for interrogating an externally-recognized IP address as to the own terminal in which the communication application program is operated with respect to an external server, and for comparing the acquired externally-recognized IP address with the IP address which has been allocated to the own terminal in order to judge as to whether or not the externally-recognized IP address is made consistent with the IP address allocated to the own terminal.

Also, the investigation step preferably includes a port-scanning judgement means for requesting an external server to execute a port-scanning operation with respect to a port used in a communication of the own terminal, in which the communication application program is operated in order to judge as to whether or not the port-scanning operation succeeds.

Also, the investigation step is preferably comprised of: an IP address investigation step for investigating an IP address which has been allocated to the own terminal in which the communication application is operated, and for judging as to whether or not the investigated IP address corresponds to a global IP address; a port-scanning judgement step for requesting an external server to execute a port-scanning operation as to a port used in the communication of the own terminal, in which the communication application program is operated, when the own terminal can access the external server, and for judging as to whether or not the port-scanning operation succeeds; and an IP address comparing step, when an invalid response is returned from the external server in the port-scanning judgement step, for interrogating an externally-recognized IP address as to the own terminal in which the communication application program is operated with respect to an external server, and for comparing the acquired externally-recognized IP address with the IP address which as been allocated in order to judge as to whether or not the externally-recognized IP address is made consistent with the IP address allocated to the own terminal.

In accordance with the present invention, when the communication is carried out between the terminals via the network by the communication application program, the network environment related to the terminal in which the communication application program is operated is investigated prior to the commencement of the communication; and such a fact that there is a possibility that the communication application program cannot be used based upon the result of this investigation is notified. As a consequence, since the users can recognize as to whether or not the reason why the communication cannot be carried out is caused by the network environment, confusions of the users can be reduced.

Figure 1:
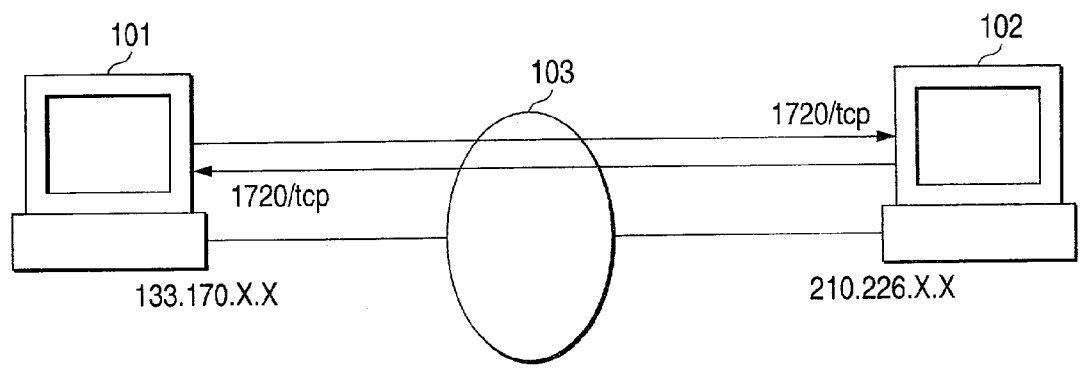
FIG. 1 is a block diagram for showing a network structural example in the case that a communication is carried out in accordance with a communication application program using the H.323 protocol.

In the figures, the reference numerals 11, 12, 13, and 16 refer to PCs; 14 to a router; 15 to an Internet; 17 to an external server; 114 to a router; 122 to a proxy server; and 132 to a firewall. Additionally, the reference numeral (1) refers to a function of "IP address investigation"; (2) to a function of "IP address comparison"; and (3) to a function of "port-scanning judgement".

DETAILED DESCRIPTION OF THE PREFERRED EMBODIMENTS

Referring now to drawings, an embodiment mode of the present invention will be described in detail.

In this embodiment mode, in the case that an application program (application software) such as a TV telephone using the H.323 protocol of ITU-T recommendation is used as a communication application program which is employed on a terminal such as a PC (personal computer) which is connected to a network, both an investigating sequence and a notifying sequence of a network environment of this terminal, and also a system of these investigating and notifying sequences are exemplified.

FIG. 1 is a block diagram for representing a structural example of a network in such a case that a communication is carried out by executing a communication application program (communication application software) utilizing the H.323 protocol.

As indicated in FIG. 1, in the communication application program used to execute a bidirectional communication in real time by using the H.323 protocol, a call setting request is transmitted from a terminal 101 as one transmission source via a network 103 to another terminal 102 as the other transmission destination, and the terminal 102 of the transmission destination returns a call setting response via the network 103 to the terminal 101 of the transmission source in response to this call setting request, so that a call connection is established. After the call connection has been established, speech (voce) data and image data are transmitted/received between these terminals 101 and 102.

In the case that a communication is executed by using the H.323 protocol, the own terminal can access a terminal as a communication counter party based upon an IP (Internet Protocol) address and a port number on an IP network. In other words, a terminal as a communication destination (transmission destination of packet) can be specified by using a global IP address such as 133.170.X.X, 210.226.X.X (symbol "X" is arbitrary integer selected from 0 to 255) shown in Fig. FIG. 1, while the global IP address has the principal address on the IP network. Then, a predetermined communication port (e.g., No. 1720 port of TCP) employed in a communication based upon the H.323 protocol can be externally accessed with respect to the terminal of this global IP address.

An example of such a network environment will be now explained as follows, in which the above-described communication application program using the H.323 protocol cannot be used.

Figure 2:
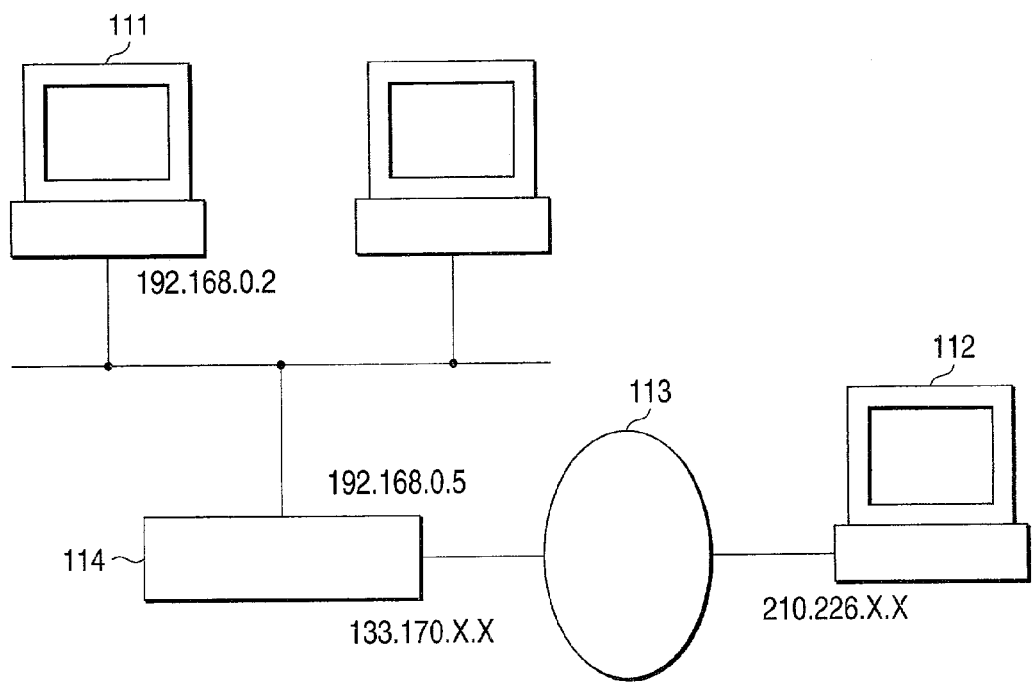
FIG. 2 is a block diagram for indicating a first example of a network environment in the case that the communication application program using the H.323 protocol cannot be utilized.

(A) In a case that a private IP address has been set to a terminal (see FIG. 2):

In such a case that a terminal 111 to which a private IP address has been set is connected via a router 114 to an external network 113, this terminal 111 cannot be directly accessed from a terminal 112 connected to the external network 113. However, the above-described communication application program using the H.323 protocol may be used in a certain case among network environments which employ an NAT (Network Address Translation) capable of executing an address translation between a private IP address and a global IP address in an one-to-one correspondence relationship.

Figure 3:
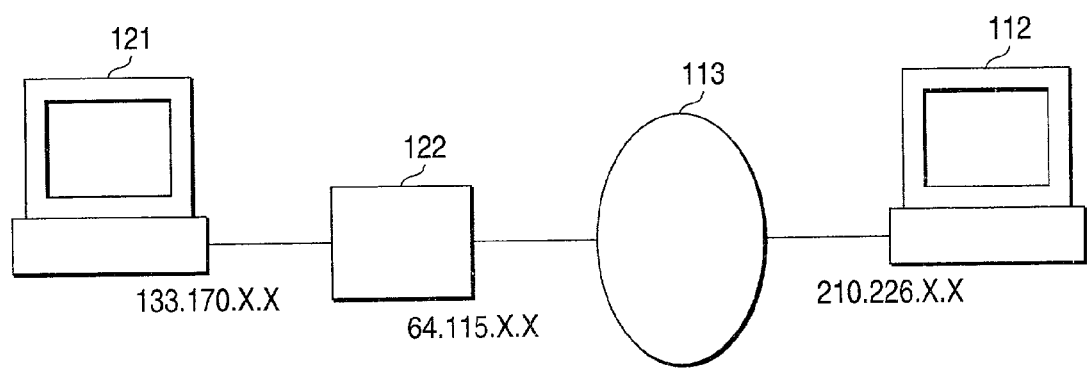
FIG. 3 is a block diagram for indicating a second example of a network environment in the case that the communication application program using the H.323 protocol cannot be utilized.

(B) In a case that a proxy server, or the like is provided between terminals and an address translation is carried out (see FIG. 3):

Generally speaking, the above-explained communication application program using the H.323 protocol cannot be used in the case that even when such a terminal 121 is employed to which a global IP address has been set, a proxy server 122 is interposed between this terminal 121 and either the external network 113 or the external terminal 112 so as to translate addresses.

Figure 4:
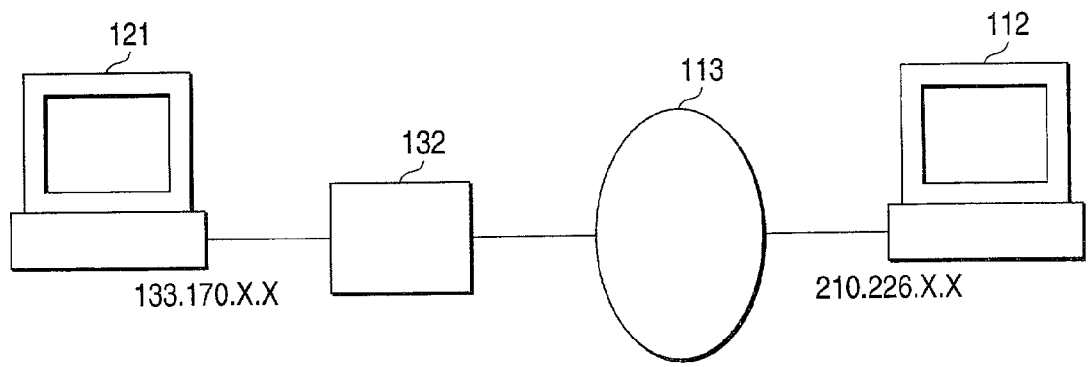
FIG. 4 is a block diagram for indicating a third example of a network environment in the case that the communication application program using the H.323 protocol cannot be utilized.

(C) In a case that a firewall, or the like is provided between an external network and a local network (see FIG. 4):

The communication application program using the H.323 protocol cannot be used in such a case that while a firewall 132 is provided between a local network where the terminal 121 is employed and the external network 113, an access to this terminal 121 from an external terminal is prohibited, and/or a port such as No. 1720 port used in a communication is closed, as viewed from the terminal 112 of the communication counter party.

As a consequence, in this embodiment mode, when the communication application program is executed, an investigation is made as to whether or not the present network environment corresponds to the above-described network environments having the above-explained problems where the communication application is used prior to the actual communication. If the present network environment owns such a communication problem, then this fact may be notified by being displayed on a screen. As a result, this embodiment mode can notify in advance such a fact that the communication application program cannot be used due to the network environment with respect to the user who uses this communication application program.

As a method for investigating a network environment, any one, or a combination of the below-mentioned three investigation methods may be carried out.

(1) IP address investigation (See FIG. 5):

An IP address which has been set/allocated to the own terminal is investigated, and if this investigated IP address corresponds to a private IP address defined by the RFC (Request For Comments) such as 10.0.0.0/8, 172.16.0.0/12, and 192.168.0.0/16, then there is assumed such a possibility that the communication application program cannot be used. The network environment of the own terminal can be investigated in a simple manner by executing this IP address investigation.

(2) IP address comparison (See FIG. 5):

An interrogation as to how the own terminal is recognized as an IP address by an external global environment is made with respect to a predetermined server installed on a global IP address. In the case that an IP address which is returned and is recognized by the external global environment is compared with an IP address which has been allocated to the own terminal, and then, the externally-recognized IP address is different from this allocated IP address, there is assumed such a possibility that the communication application program cannot be used. This IP address interrogation which can be externally observed is carried out by an cgi, or asp access operation by using an HTTP protocol with respect to, for example, a server operated by a provider of a communication application program. Since this IP address comparison is carried out, it is possible to judge a network environment required for a communication based upon the IP address of the own terminal, which is externally recognized.

(3) Port-scanning judgement (See FIG. 5):

With respect to a port (namely, H.323 connection port: No. 1720 port of TCP) which is used by a communication application program by which a communication is actually performed, a predetermined server installed at a global IP address requests a port-scanning operation. When this port-scanning operation fails, there is assumed such a possibility that the communication application program cannot be used. Also, as to the request for the port-scanning operation, for example, this port-scanning operation is carried out by an cgi, or asp access operation using an HTTP protocol with respect to a server operated by a provider of a communication application program.

Since this port-scanning judgement is made as to whether or not the own terminal can be externally accessed, the network environment required for the communication can be furthermore firmly judged. For example, in such a case that a gateway apparatus is provided which is exclusively dedicated to a communication by using the H.323 protocol, even when an IP address which may be externally recognized is made different from an IP address which has been allocated to the own terminal, the communication may be established. In such a case, it is possible to judge as to whether or not the firmly-communicatable network environment is available by executing the port-scanning judgement.

When there is such a possibility that a communication application program cannot be used, an explanation message "since PC of our customer is no directly connected to Internet, communication may not be probably carried out" is displayed on a screen by way of a dialog box window, by which such a notification may be notified to a user who tries to use the communication application program by this terminal (PC). As a result, the user can recognize such a fact that the communication application program cannot be used due to the network environment. It should be noted that as a reason why such a communication application program cannot be used, a detailed investigation result of a network environment may be notified to a user. In this case, since the user may grasp the own network environment, this user can easily take a necessary solution.

Figure 5:
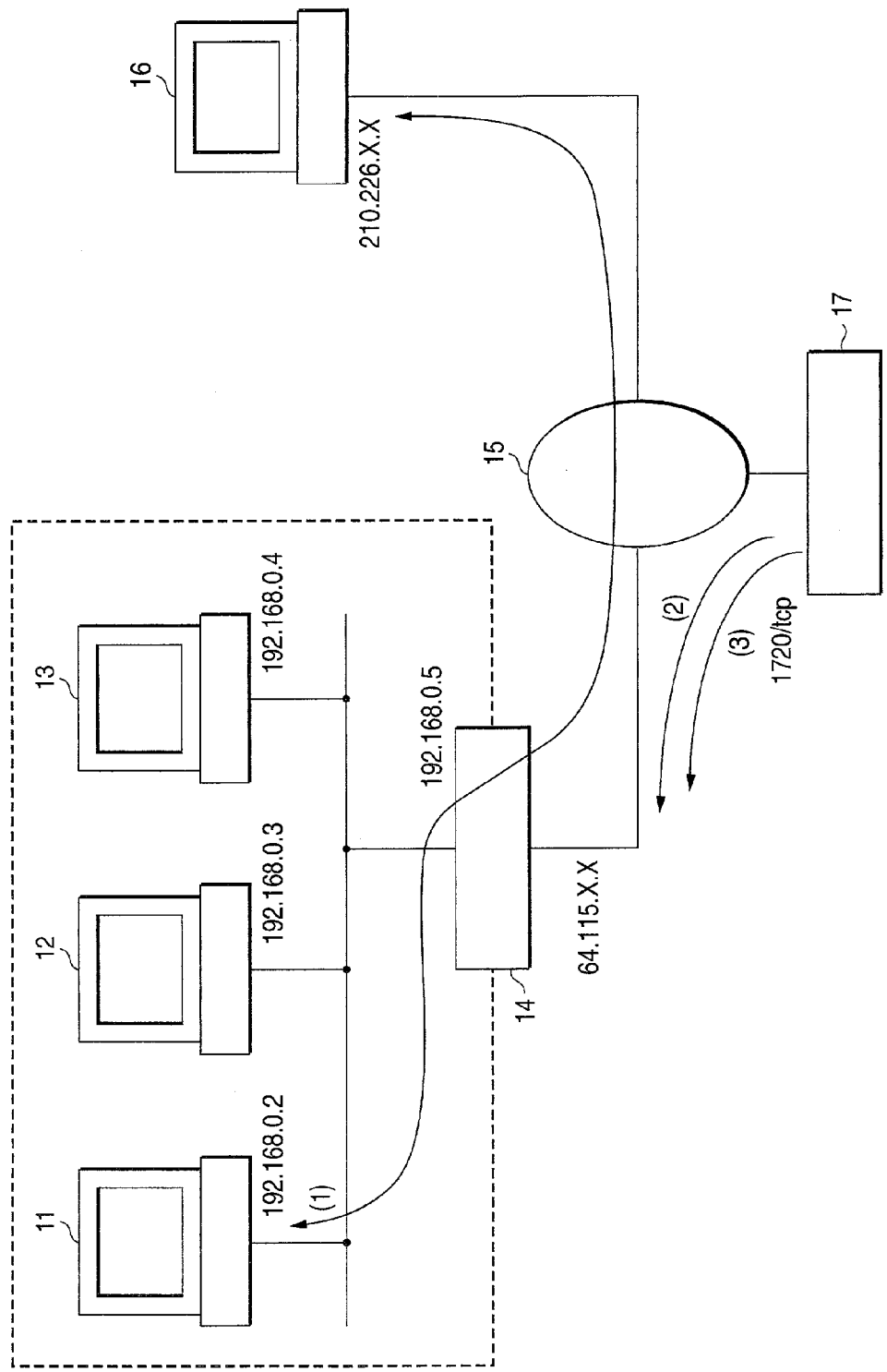
FIG. 5 is a block diagram for showing a structural example of a system for executing a network environment notifying method according to an embodiment mode of the present invention.
Figure 6:
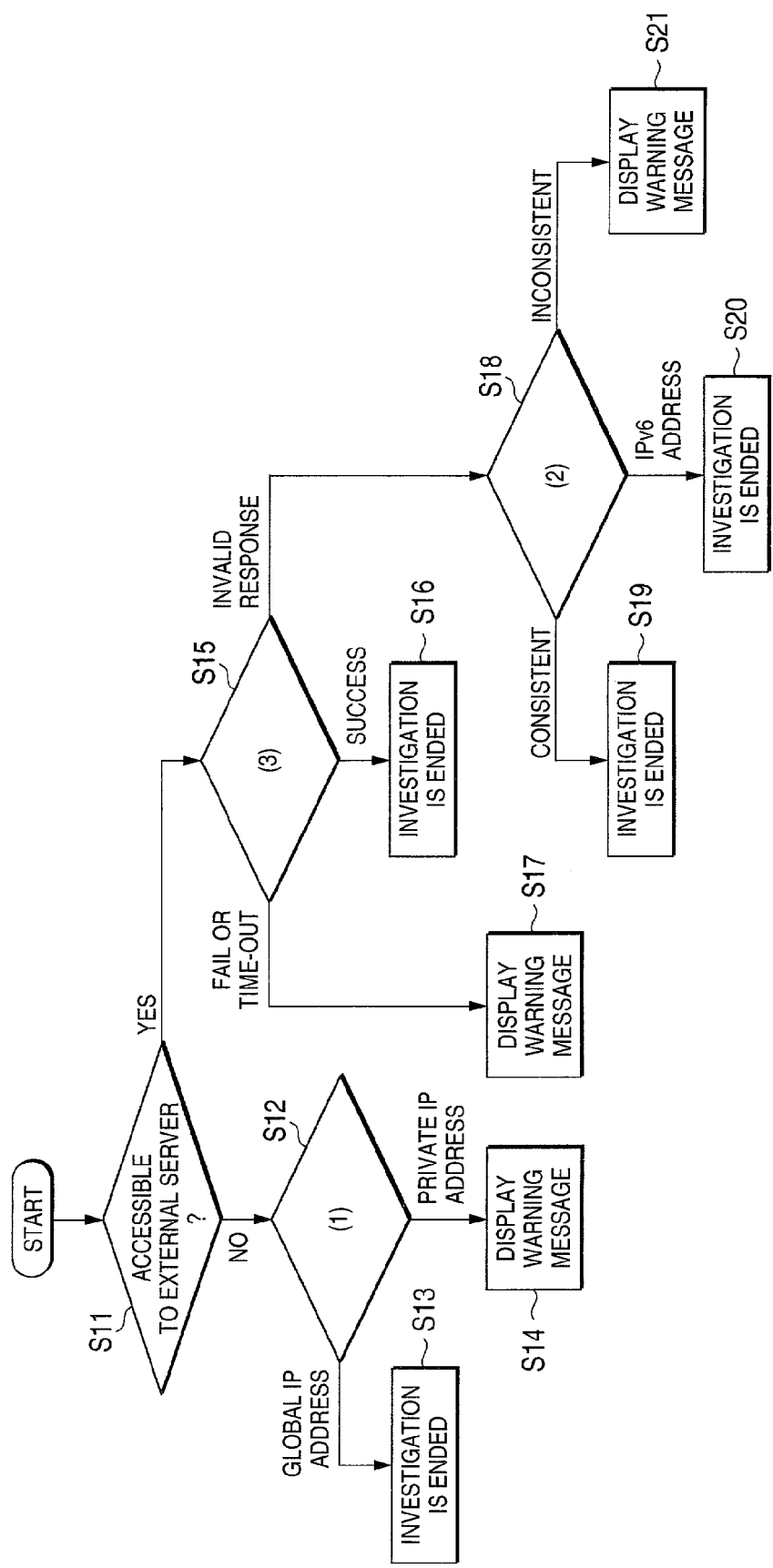
FIG. 6 is a flow chart for describing a sequential operation as to a network environment notifying method according to an embodiment mode of the present invention.

Next, the above-described network environment investigation sequence and network environment notification sequence will be explained more in detail. FIG. 5 is a block diagram for representing a structural example of such a system capable of executing a network environment notifying method according to this embodiment mode of the present invention. FIG. 6 is a flow chart for describing a sequential operation as to a network environment notifying method according to this embodiment mode. In this embodiment mode, the following case is explained. That is, a communication application program (communication application software) is used by a PC (personal computer) 11 corresponding to a terminal provided in a private network.

This PC 11 is connected to other PC 12 and PC 13 via the private network, and private IP addresses 192.168.0.2, 192.168.0.3, and 192.168.0.4 have been allocated to these PCs 11, 12, 13. These PCs 11, 12, 13 are connected via a router 14 to the Internet 15, while this router 14 corresponds to a dial-up router in which 192.168.0.5 has been allocated as an internal private IP address, and 64.115.X.X has been allocated as an external global IP address. To the Internet 15, an external PC 16 (global IP address of 210.226.X.X has been allocated) corresponding to a communication party is connected, and also, an external server 17 and the like, which are operated by a provider of the communication application program, are connected.

As previously explained, in such a case that the PC 11 connected to such a private network executes a communication using the H.323 protocol by using the communication application program via the Internet 15 with respect to the external PC 16, the communication cannot be established by this PC 11 under this network environment. In accordance with this embodiment mode, when the communication application is executed, at least one of the above-described three network environment investigating methods is carried out prior to a commencement of the communication. When there is such a possibility that the communication application program cannot be used, this fact is notified so as to avoid the confusion of the user.

FIG. 6 represents an example of a sequential operation in which the three network environment investigation methods are combined with each other to be executed. When the communication application program is initiated in the PC 11, the PC 11 checks as to whether or not this PC 11 can access the external server 17 in a first step S11. In the case that this PC 11 cannot access the external server 17, the PC 11 executes the IP address investigation of the investigating method (1) in a step S12. In this case, the PC 11 investigates an IP address which has been allocated to the own terminal in order to judge as to whether this IP address corresponds to a private IP address, or a global IP address. In the case that the IP address of the own terminal corresponds to the global IP address, the IP address investigation is ended in a step S13. Then, the PC 11 is advanced to a communication sequence. On the other hand, in such a case that the IP address of the own terminal corresponds to the private IP address, such a warning message "communication may not be probably carried out due to network environment" is displayed, so that the user can be notified by such a fact that this communication application program cannot be used.

In the case that the PC 11 can access the external server 17 in the above-described step S11, a port-scanning operation of the investigation method (3) is carried out in step S15. In this case, when the PC 11 requests the external server 17 to execute the port-scanning operation by way of the cgi access operation using the HTTP protocol, this external server 17 tries to perform the port-scanning operation based upon the port number (No. 1720 port of TCP) used in the communication with respect to the PC 11. In the case that this port-scanning operation can succeed, namely, in such a case that the own terminal (PC 11) can be accessed by an external terminal by employing the IP address which can be externally viewed and the port number which is used in the communication, the investigation is ended in a step S16. Then, the PC 11 advances to a communication sequential operation. To the contrary, when either the port-scanning operation fails or the process operation is brought into time-out, a warning message is displayed in a step S17, so that the user is notified by such a fact that this communication application program cannot be used.

Also, in such a case that the PC 11 receives an invalid response as the result of the port-scanning operation in the step S15 from the external server 17, the IP address comparison of the investigation method (2) is carried out in a step S18. In this case, when an interrogation as to the IP address of the own terminal is made from the PC 11 with respect to the external server 17 by way of the cgi access operation using the HTTP protocol, this external server 17 sends a response as to how IP address can be externally viewed with respect to the PC 11. Then, in such a case that an IP address obtained as the interrogation result is compared with the IP address which has been allocated to the own terminal, and then, this IP address is made consistent with the allocated IP address, the investigation (2) is accomplished in a step S19. Then, the PC 11 advances to a communication sequential operation. Also, in the case that an address of IPv6 is obtained in this interrogation, and the address of IPv6 is observed from the external terminal, the investigation (2) is ended in a step S20. Then, the PC 11 advances to a communication sequential operation. On the other hand, in such a case that the externally-observed IP address is not made consistent with the IP address which has been allocated to the own terminal, a warning message is displayed in a step S21, so that the user is notified by such a fact that this communication application program cannot be used.

The above-explained investigating process operation and notifying process operation as to the network environment may be installed in the terminal where the communication application program is executed in the form of such a program which is integrally constituted with this communication application program, or another program which belongs to the communication application program. These investigating/notifying process operations may be executed by a computer as a process operation executed when the communication application program is initiated.

As previously described, in accordance with this embodiment mode, while the communication such as the TV telephone is carried out between the terminals via the network in accordance with the communication application program using the H.323 protocol, the network environment at the terminal when this communication application program is operated is carried out prior to the commencement of the communication. When it is so judged that the communication application program may not probably be used due to the reason of network environment at this terminal based upon this investigation result, such a fact is notified. As a result, since the users can recognize as to whether or not the reason why the communication cannot be established is caused by the network environment, the confusion by the users can be reduced. Also, the provider of the communication application program can reduce the support cost, since the interrogations as to whether or not the communication application program cannot be used issued from the user to the support center.

As previously described, in accordance with the present invention, when the communication application program is used via the network, such a possibility that the communication cannot be established due to the network environment can be notified to the user prior to the commencement of the communication. Therefore, there is an effect that the confusion of the users can be reduced.

What is claimed is:

1. A method for determining if a communication application program is operable in a network environment of a first terminal prior to commencement of communication between the first terminal and a second terminal via the network, the method comprising:

investigating the network environment related to the first terminal in which the communication application program is operated using a first investigation method;

further investigating the network environment related to the first terminal using a second investigation method; and providing a message to the first terminal indicating that there is a possibility that the communication application program cannot be used based upon a result of the investigations, wherein the first investigation method includes investigating an IP address allocated to the first terminal, and judging whether or not the investigated IP address corresponds to a global IP address; and wherein the second investigation method includes at least one of:

acquiring an externally-recognized IP address as to the first terminal, and comparing the externally-recognized IP address with an IP address allocated to the first terminal in order to judge whether or not the externally-recognized IP address is consistent with the IP address allocated to the first terminal; and externally executing a port-scanning operation with respect to a port used in the communication of the first terminal in order to judge whether or not the port-scanning operation succeeds.

2. The method according to claim 1, wherein the second investigation method comprises:

acquiring an externally-recognized IP address of the first terminal;

comparing the externally-recognized IP address with an IP address allocated to the first terminal to determine whether or not the externally-recognized IP address is consistent with the IP address allocated to the first terminal.

3. The method according to claim 1, wherein the second investigation method comprises:
externally executing a port-scanning operation with respect to a port used in communication of the first terminal in order to determine whether or not the port-scanning operation succeeds.

4. A system for determining if a communication application program is operable in a network environment of a first terminal prior to commencement of communication between the first terminal and a second terminal via the network, comprising:
an investigation device for investigating the network environment of the first terminal in which the communication application program is operated using a first and second investigation method;
a notification device for providing a message to the first terminal indicating that there is a possibility that the communication application program cannot be used based upon a result of the investigation;
an external server connected via the network to the first terminal; and
a port-scanning judgment device for requesting the external server to execute a port-scanning operation with respect to a port used in the communication of the first terminal in order to judge whether or not the port-scanning operation succeeds,
wherein the external server connected via the network to the first terminal includes a port-scanning operation executing device for executing a port-scanning operation with respect to a port used in the communication of the first terminal in response to a request issued from the first terminal, and for returning a result of the port-scanning operation to the first terminal.

5. The system according to claim 4, wherein the first investigation method includes investigating an IP address allocated to the first terminal, and judging whether or not the investigated IP address corresponds to a global IP address; and
wherein the second investigation method includes at least one of
acquiring an externally-recognized IP address as to the first terminal, and comparing the externally-recognized IP address with an IP address allocated to the first terminal in order to judge whether or not the externally-recognized IP address is consistent with the IP address allocated to the first terminal; and
externally executing a port-scanning operation with respect to a port used in the communication of the first terminal in order to judge whether or not the port-scanning operation succeeds.

6. The system according to claim 4, wherein the first investigation method includes:
investigating an IP address which has been allocated to the first terminal; and
judging whether or not the investigated IP address corresponds to a global IP address.

7. The system according to claim 4, further comprising:
an IP address comparing device for interrogating an externally-recognized IP address as to the first terminal with respect to the external server, and for comparing the acquired externally-recognized IP address with an IP address allocated to the first terminal in order to determine whether or not the externally-recognized IP address is consistent with the IP address allocated to the first terminal; and
wherein the external server connected via the network to the first terminal includes an IP address acquiring device for acquiring an IP address which is recognized outside the first terminal in response to an interrogation issued from the first terminal and for returning the acquired IP address to the first terminal.

8. A computer executable program stored on a computer readable medium for determining if a communication application program is operable in a network environment of a first terminal prior to commencement of communication between the first terminal and a second terminal via the network, the computer-executable program comprising code to execute the steps of:
investigating the network environment related to the first terminal in which the communication application program is operated using a first investigation method;
further investigating the network environment using a second investigation method; and
providing a message to the first terminal indicating that there is a possibility that the communication application program cannot be used based upon a result of the investigation,
wherein the first investigation method includes investigating an IP address allocated to the first terminal; and
wherein the second investigation includes at least one of:
determining whether or not the investigated IP address corresponds to a global IP address, and requesting an external server to execute a port-scanning operation as to a port used in the communication of the first terminal, when the first terminal can access the external server, and for judging whether or not the port-scanning operation succeeds; and
interrogating an externally-recognized IP address of the first terminal when an invalid response is returned from the external server in the step of port-scanning judging, and comparing the acquired externally-recognized IP address with an IP address allocated to the first terminal in order to judge whether or not the externally-recognized IP address is consistent with the IP address allocated to the own terminal.

9. The program according to claim 8, wherein the second investigation method comprises:
acquiring an externally-recognized IP address of the first terminal; and
comparing the externally-recognized IP address with an IP address allocated to the first terminal to determine whether or not the externally-recognized IP address is consistent with the IP address allocated to the first terminal.

10. The program according to claim 8, wherein the second investigation method comprises:
externally executing a port-scanning operation with respect to a port used in communication of the first terminal in order to determine whether or not the port-scanning operation succeeds.

* * * * *